(12) United States Patent
Mizutani (10) Patent No.: US 10,766,658 B2
(45) Date of Patent: *Sep. 8, 2020

(54) LABEL PEELING DEVICE (71) Applicants: KABUSHIKI KAISHA TOSHIBA, Tokyo (JP); TOSHIBA TEC KABUSHIKI KAISHA, Tokyo (JP)

(72) Inventor: Kikuo Mizutani, Izu Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,310

(22) Filed: Sep. 25, 2019

(65) Prior Publication Data

US 2020/0017250 A1 Jan. 16, 2020

Related U.S. Application Data

(63) Continuation of application No. 15/628,084, filed on Jun. 20, 2017, now Pat. No. 10,464,704.

(30) Foreign Application Priority Data

Jan. 20, 2017 (JP) .................................. 2017-008669

(51) Int. Cl.
*B32B 43/00* (2006.01)
*B65C 9/00* (2006.01)
*B65C 11/02* (2006.01)

(52) U.S. Cl.
CPC ........ *B65C 9/0006* (2013.01); *B65C 11/0289* (2013.01); *B32B 43/006* (2013.01); *B32B 2519/00* (2013.01); *B65C 11/0226* (2013.01); *B65C 2009/009* (2013.01); *B65C 2210/0078* (2013.01); *B65C 2210/0094* (2013.01);
(Continued)

(58) Field of Classification Search
CPC ......... Y10T 156/1142; Y10T 156/1168; Y10T 156/1195; Y10T 156/1978; Y10T 156/1989; Y10T 156/1994; B65C 9/0006; B65C 11/0289; B65C 2210/0078; B65C 2210/0094; C09J 2205/302; B32B 43/006
See application file for complete search history.

(56) References Cited

U.S. PATENT DOCUMENTS 3,547,745 A 12/1970 Winston
5,090,680 A 2/1992 Yashiro
(Continued)

FOREIGN PATENT DOCUMENTS

EP 3086316 A1 11/2016
JP 2001315730 A 11/2001
WO 9533652 A1 12/1995

*Primary Examiner* — Mark A Osele
(74) *Attorney, Agent, or Firm* — Kim & Stewart LLP (57) ABSTRACT

According to one embodiment, a label peeling device includes a tray, a pressing unit, and a control unit. The tray is configured to support a label sheet thereon. The pressing unit is configured to be driven in a direction perpendicular to a conveyance direction of the label sheet. The control unit is configured to drive the pressing unit toward a central portion of the label sheet supported on the tray. The control unit performs peeling control to peel a liner sheet and a label body of the label sheet from each other by pressing an edge of the label sheet and thereby curving the label sheet.

19 Claims, 9 Drawing Sheets

(52) U.S. Cl.
CPC .... *Y10T 156/1168* (2015.01); *Y10T 156/1195* (2015.01); *Y10T 156/1978* (2015.01); *Y10T 156/1989* (2015.01); *Y10T 156/1994* (2015.01)

(56) References Cited

U.S. PATENT DOCUMENTS

| | | |
|---|---|---|
| 5,478,428 A | 12/1995 | Carpenter |
| 5,478,434 A | 12/1995 | Kerr et al. |
| 5,520,776 A | 5/1996 | Van Allen et al. |
| 5,653,850 A | 8/1997 | Watanabe |
| 5,658,416 A | 8/1997 | MacCollum et al. |
| 5,861,077 A | 1/1999 | Kamijo et al. |
| 5,863,374 A | 1/1999 | Silveira et al. |
| 6,089,770 A | 7/2000 | Kamijo et al. |
| 10,464,704 B2 * | 11/2019 | Mizutani ............... B65C 9/0006 |
| 2015/0225105 A1 | 8/2015 | Sakaino et al. |
| 2015/0314584 A1 | 11/2015 | Dong et al. |
| 2017/0326865 A1 | 11/2017 | Ayabe et al. |

* cited by examiner

LABEL PEELING DEVICE

CROSS-REFERENCE TO RELATED APPLICATION

This application is a continuation of U.S. patent application Ser. No. 15/628,084, filed on Jun. 20, 2017, which is based upon and claims the benefit of priority from Japanese Patent Application No. 2017-008669, filed Jan. 20, 2017, the entire contents of each of which are incorporated herein by reference.

FIELD

Embodiments described herein relate generally to a label peeling device.

BACKGROUND

There is a known label peeling device that enables peeling a label from a liner sheet. If the label and the liner sheet are configured in the shape of a roll sheet, when the roll sheet is set on the device first, the label is then automatically peeled from the liner sheet.

However, in the case of a single cut label sheet including a label body having an adhesive surface and a liner sheet adhered to the adhesive surface, the label body is difficult to peel from the liner sheet. If a component exclusively used to peel the label body is provided, the device would increase the size and cost of production of the label peeling device.

DETAILED DESCRIPTION

Embodiments provide a label peeling device capable of facilitating peeling of a label body from a liner sheet with a simple configuration.

In general, according to one embodiment, a label peeling device includes a tray, a pressing unit, and a control unit. The tray is configured to support a label sheet thereon. The pressing unit is configured to be driven in a direction perpendicular to a conveyance direction of the label sheet. The control unit is configured to drive the pressing unit toward a central portion of the label sheet supported on the tray. The control unit performs peeling control to peel a liner sheet and a label body of the label sheet from each other by pressing an edge of the label sheet and thereby curving the label sheet.

Hereinafter, a label peeling device according to an embodiment will be described with reference to the drawings. Furthermore, in the following description, components having the same or similar functions are assigned the same reference characters, and in some cases the description of such components is not repeated for brevity.

Figure 1:
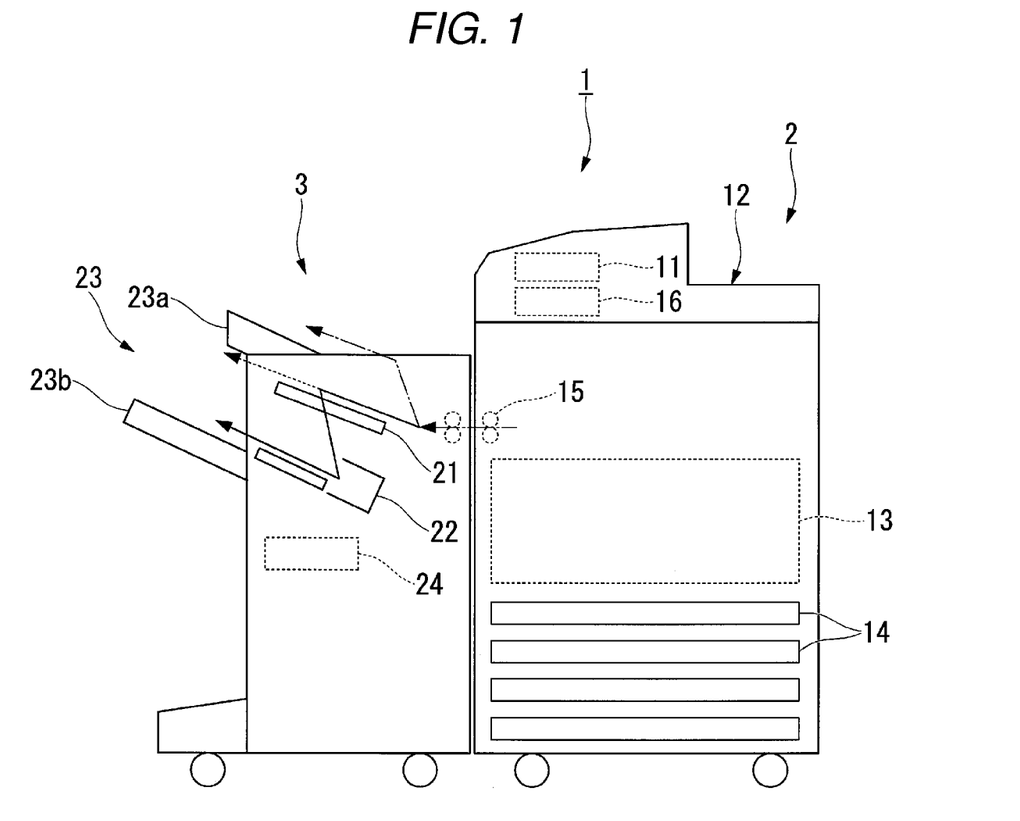
FIG. 1 is a front view illustrating a configuration of an image forming system according to an embodiment.
Figure 2:
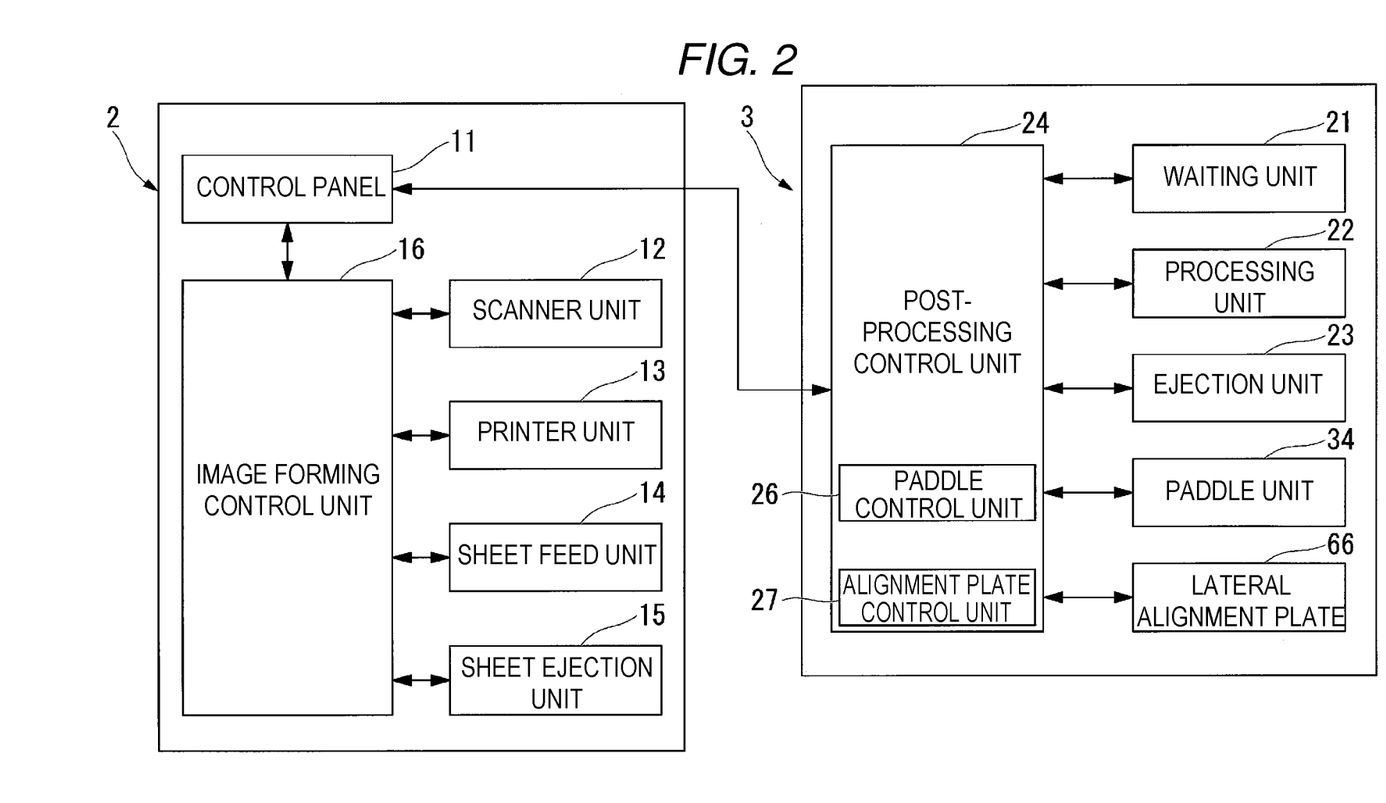
FIG. 2 is a block diagram illustrating a configuration of the image forming system according to the embodiment.

A label peeling device according to one embodiment is described with reference to FIG. 1 to FIGS. 11A and 11B. First, FIG. 1 and FIG. 2 illustrate an example of the entire configuration of an image forming system 1. The image forming system 1 includes an image forming apparatus 2 and a post-processing apparatus 3. The image forming apparatus 2 forms an image on a sheet-like recording medium such as a sheet of paper (hereinafter referred to as a "sheet S" (shown in FIG. 3)). The post-processing apparatus 3 performs post-processing on the sheet S, which is conveyed from the image forming apparatus 2. The sheet S includes a label sheet LS, which is described below. The post-processing apparatus 3 includes a label peeling device 25, which is described below.

The image forming apparatus 2 includes a control panel 11, a scanner unit 12, a printer unit 13, a sheet feed unit 14, a sheet ejection unit 15, and an image forming control unit 16.

The control panel 11 includes, for example, various keys or a touch panel, which receives an operation of the user. For example, the control panel 11 receives an input concerning the type of post-processing to be performed on the sheet S. The image forming apparatus 2 sends, to the post-processing apparatus 3, information about the type of post-processing input via the control panel 11.

The scanner unit 12 includes a reading unit which reads image information about an object to be copied. The scanner unit 12 sends the read image information to the printer unit 13.

The printer unit 13 forms an output image using a developer such as toner (hereinafter referred to as a "toner image") based on image information transmitted from the scanner unit 12 or an external apparatus. The printer unit 13 transfers the toner image onto the surface of the sheet S. The printer unit 13 applies heat and pressure to the toner image transferred to the sheet S, thus fixing the toner image to the sheet S.

The sheet feed unit 14 supplies sheets S one by one to the printer unit 13 in conformity with timing at which the printer unit 13 forms the toner image.

The sheet ejection unit 15 conveys the sheet S, which is ejected from the printer unit 13, to the post-processing apparatus 3.

The image forming control unit 16 controls operations of the entire image forming apparatus 2. In other words, the image forming control unit 16 controls the control panel 11, the scanner unit 12, the printer unit 13, the sheet feed unit 14, and the sheet ejection unit 15. The image forming control unit 16 is configured with a control circuit including a central processing unit (CPU), a read-only memory (ROM), and a random access memory (RAM).

Next, the post-processing apparatus 3 is described.

First, the entire configuration of the post-processing apparatus 3 is described. As illustrated in FIG. 1, the post-processing apparatus 3 is located adjacent to the image forming apparatus 2. The sheet S is conveyed from the image forming apparatus 2 to the post-processing apparatus 3 face-up with the print side upwards. The post-processing apparatus 3 performs post-processing specified via the control panel 11 on the conveyed sheet S. Examples of the post-processing include sheet binding processing, sort processing, and label peeling processing.

The post-processing apparatus 3 includes a waiting unit 21, a processing unit 22, an ejection unit 23, and a post-processing control unit 24.

Figure 5:
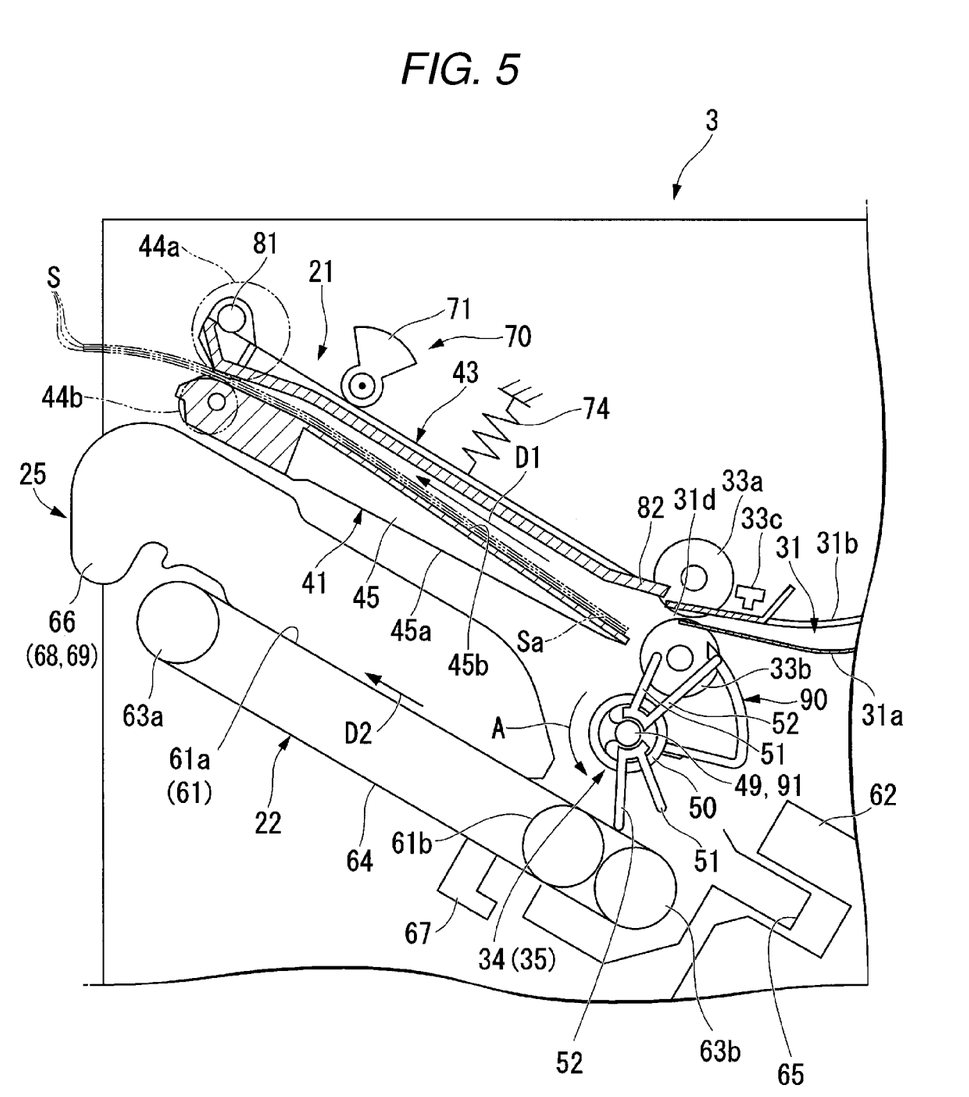
FIG. 5 is a sectional view illustrating the waiting unit and the processing unit according to the embodiment.

As illustrated in FIG. 5, the waiting unit 21 temporarily buffers the sheets S conveyed from the image forming apparatus 2. For example, during a period in which post-processing of the preceding sheet S is performed by the processing unit 22, the waiting unit 21 causes a plurality of subsequent sheets S to wait. The waiting unit 21 is located above the processing unit 22. For example, the waiting unit 21 causes a plurality of sheets S to wait in a stacked manner. When the processing unit 22 becomes vacant, the waiting unit 21 causes the stacked sheets S to fall toward the processing unit 22.

The processing unit 22 performs post-processing on the conveyed sheet or sheets S. For example, the processing unit 22 performs sort processing for gathering or aligning a plurality of sheets S in their proper sequence. For example, the processing unit 22 performs sheet binding processing on a sheet bundle including a plurality of sheets S with staples or adhesive tape. For example, the processing unit 22 performs a label peeling process for peeling a liner sheet S2 and a part of label paper or body S1 from each other on the conveyed label sheet LS (see FIGS. 11A and 11B). The processing unit 22 ejects the sheet S subjected to the post-processing onto the ejection unit 23.

As illustrated in FIG. 1, the ejection unit 23 includes a fixed tray 23a and a movable tray 23b. The fixed tray 23a is provided at an upper portion of the post-processing apparatus 3. The movable tray 23b is provided at a side portion of the post-processing apparatus 3. The sheets S are ejected from the waiting unit 21 and the processing unit 22 to the fixed tray 23a and the movable tray 23b.

Figure 3:
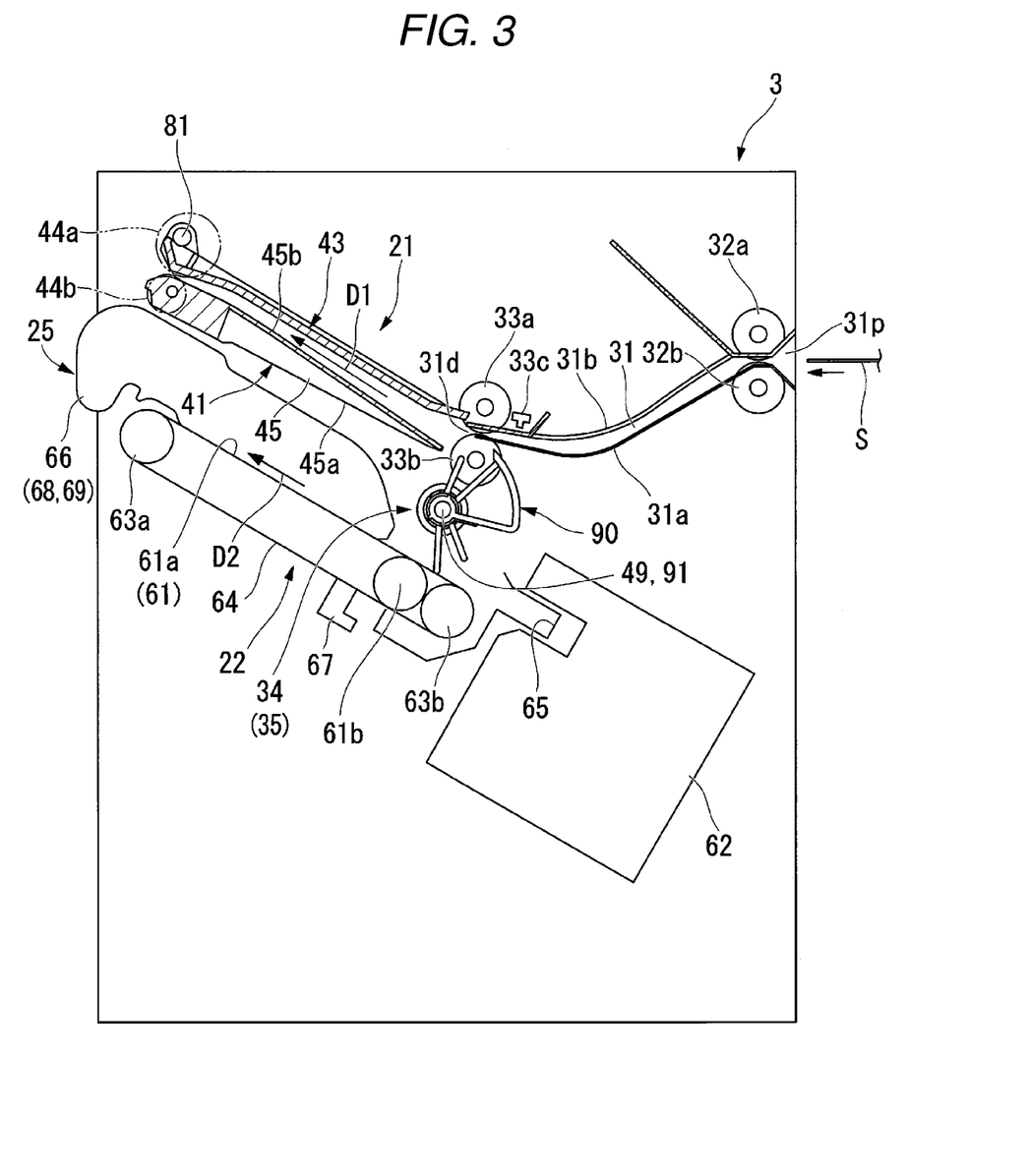
FIG. 3 is a sectional view illustrating a post-processing apparatus of the image forming system according to the embodiment.

The post-processing control unit 24 controls operations of the entire post-processing apparatus 3. In other words, the post-processing control unit 24 controls operations of the waiting unit 21, the processing unit 22, the ejection unit 23, a paddle unit 34, and a lateral alignment plate 66. As illustrated in FIG. 3 and FIG. 5, the post-processing control unit 24 also controls operations of entrance rollers 32a and 32b, exit rollers 33a and 33b, an assist guide 43, and a rear end chuck 90. The post-processing control unit 24 is configured with a control circuit including a CPU, a ROM, and a RAM, as with the image forming control unit 16.

Next, a configuration of each unit of the post-processing apparatus 3 is described in detail.

Furthermore, the term "sheet conveyance direction" in the context of the present specification refers to a direction indicated by an arrow D1 in the waiting unit 21 and a direction indicated by an arrow D2 in the processing unit 22. The arrow D1 indicates the conveyance direction of the sheet S in a waiting tray 41 (the entry direction of the sheet S to the waiting tray 41). The arrow D2 indicates the conveyance direction of the sheet S in a processing tray 61 (the ejection direction of the sheet S from the processing tray 61).

Moreover, the terms "upstream side" and "downstream side" in the context of the present specification refer to the upstream side (the side closer to the image forming apparatus 2) and the downstream side in the sheet conveyance direction, respectively. Furthermore, the terms "front end portion" and "rear end portion" in the context of the present specification refer to the "downstream end portion" and the "upstream end portion" in the sheet conveyance direction, respectively. Additionally, in the context of the present specification, the direction that is parallel to the plane surface of the sheet S (the sheet surface direction) and is approximately perpendicular to the sheet conveyance direction is referred to as a "sheet width direction W" (shown in FIG. 4).

FIG. 3 schematically illustrates a configuration of the post-processing apparatus 3. As illustrated in FIG. 3, the post-processing apparatus 3 includes a conveyance path 31 for the sheet S, a pair of entrance rollers 32a and 32b, a pair of exit rollers 33a and 33b, the waiting unit 21, the processing unit 22, the paddle unit 34, and the lateral alignment plate 66.

The paddle unit 34 is configured with a longitudinal alignment device 35, which defines the position of the sheet S in the sheet conveyance direction D2, together with a paddle control unit 26 (shown in FIG. 2) of the post-processing control unit 24, a rear end stopper 65, and a bundle claw 67. The lateral alignment plate 66 is configured with a lateral alignment device 68, which defines the position of the sheet S in the sheet width direction W, together with an alignment plate control unit 27 (shown in FIG. 2) of the post-processing control unit 24. The lateral alignment plate 66 is configured with a pressing unit, which is able to be driven in the sheet width direction W, together with a drive source (for example, a pulse motor) for the lateral alignment plate 66. The alignment plate control unit 27 performs alignment control to define the position of the label sheet LS (shown in FIG. 9) in the sheet width direction W by driving the pressing unit up to an alignment position P1, which is described below. The alignment plate control unit 27 provides peeling control to peel the liner sheet S2 and the label body S1 of the label sheet LS (both shown in FIG. 9) from each other by pressing an edge T3 (shown in FIG. 10) of the label sheet LS and curving the label sheet LS. The lateral alignment plate 66 forms a label pressing device 69, which performs label peeling processing of the label sheet LS, together with the alignment plate control unit 27 of the post-processing control unit 24.

The conveyance path 31 is provided inside the post-processing apparatus 3. For example, the conveyance path 31 is defined by a first guide member 31a and a second guide member 31b. The first guide member 31a forms a lower surface of the conveyance path 31. The second guide member 31b forms an upper surface of the conveyance path 31. The conveyance path 31 includes a sheet supply port 31p and a sheet ejection port 31d. The sheet supply port 31p faces the image forming apparatus 2. The sheet S is supplied from the image forming apparatus 2 to the sheet supply port 31p. The sheet ejection port 31d faces the waiting unit 21. The sheet S passing through the conveyance path 31 is ejected from the sheet ejection port 31d to the waiting unit 21.

The entrance rollers 32a and 32b are provided in the vicinity of the sheet supply port 31p. The entrance rollers 32a and 32b are arranged in parallel to each other and located opposite each other in the radial direction thereof. The entrance roller 32a is a driving roller located at the upper surface side of the conveyance path 31. The entrance roller 32b is a driven roller (coupled to a drive mechanism) located at the lower surface side of the conveyance path 31. The entrance rollers 32a and 32b nip the sheet S therebetween. The entrance rollers 32a and 32b convey the sheet S, supplied to the sheet supply port 31p, toward the downstream side of the conveyance path 31. The entrance rollers 32a and 32b convey the sheet S up to the exit rollers 33a and 33b.

The exit rollers 33a and 33b are provided in the vicinity of the sheet ejection port 31d. The exit rollers 33a and 33b are arranged in parallel to each other and located opposite each other in the radial direction thereof. The exit roller 33a is a driving roller located at the upper surface side of the conveyance path 31. The exit roller 33b is a driven roller located at the lower surface side of the conveyance path 31. The exit rollers 33a and 33b nip the sheet S therebetween. The exit rollers 33a and 33b convey the sheet S, conveyed by the entrance rollers 32a and 32b, toward the waiting unit 21 from the sheet ejection port 31d.

Next, the waiting unit 21 is described.

The waiting unit 21 includes a waiting tray (also referred to as a buffer tray) 41, an opening and closing driving portion 42 (see FIG. 4), an assist guide 43, and ejection rollers 44a and 44b.

The rear end portion of the waiting tray 41 is located in the vicinity of the exit rollers 33a and 33b. The rear end portion of the waiting tray 41 is located below the sheet ejection port 31d of the conveyance path 31. The waiting tray 41 is slanted with respect to the horizontal direction in such a way as to become gradually higher when approaching the downstream side in the sheet conveyance direction D1. During a period in which post-processing is performed at the processing unit 22, the waiting tray 41 causes a required number of sheets S to wait.

The waiting tray 41 includes a bottom, wall 45 and side walls (not illustrated). The bottom wall 45 includes a lower surface 45a and an upper surface (which is a conveyance surface) 45b. The bottom wall 45 supports the sheet S from below. The side walls support the side portions of the sheet S in the sheet width direction W.

Figure 4:
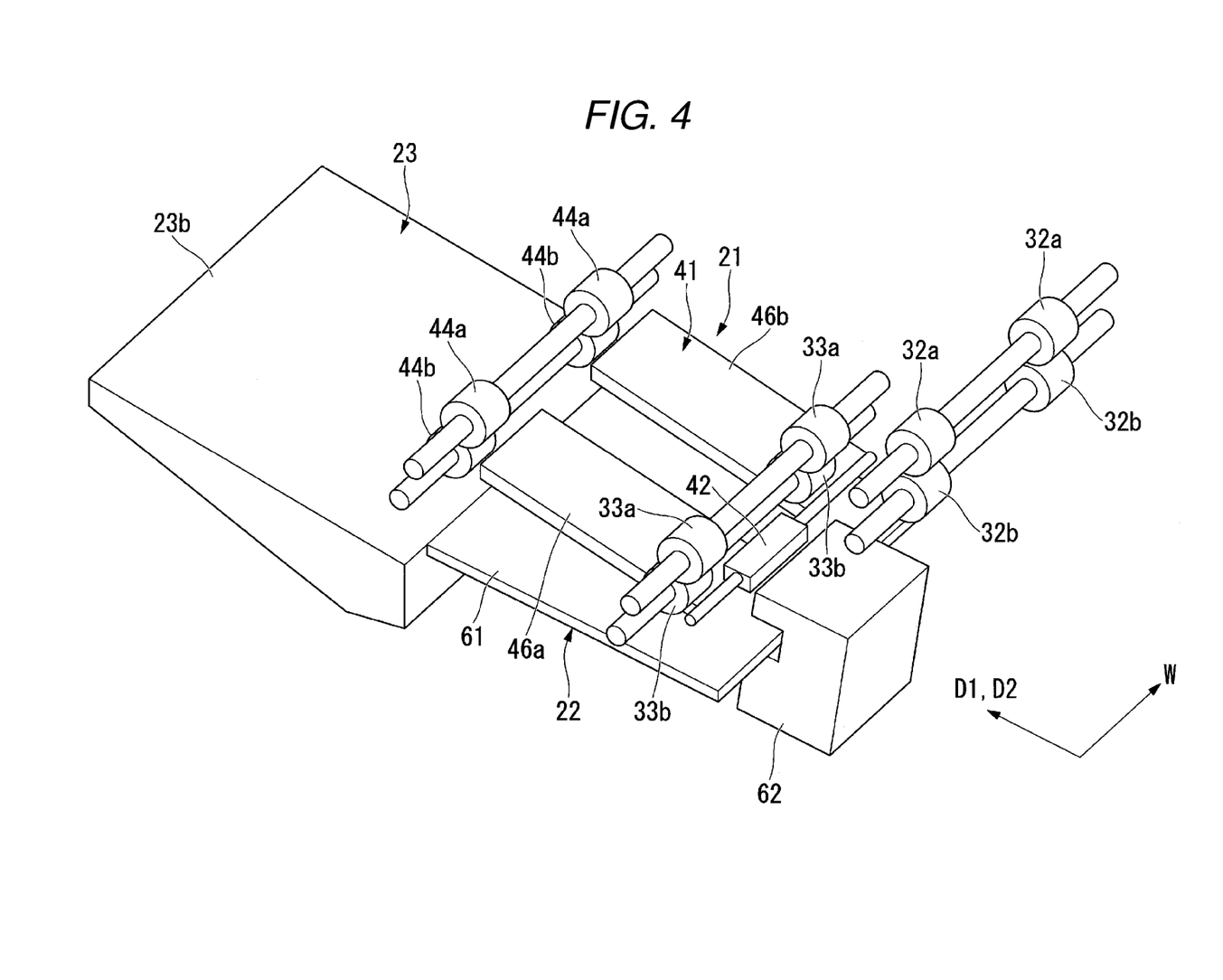
FIG. 4 is a perspective view illustrating a waiting unit and a processing unit of the post-processing apparatus according to the embodiment.

FIG. 4 schematically illustrates the waiting tray 41. As illustrated in FIG. 4, the waiting tray 41 includes a first tray member 46a and a second tray member 46b. The first tray member 46a and the second tray member 46b are spaced away from each other in the sheet width direction W (laterally). The first tray member 46a and the second tray member 46b are movable both in directions to come close to each other and in directions to move away from each other (laterally in the sheet width direction W).

The opening and closing driving portion 42 is able to drive the first tray member 46a and the second tray member 46b laterally in both directions to come close to each other and in directions to move away from each other. In a case where the sheet S waits at the waiting tray 41, the opening and closing driving portion 42 causes the first tray member 46a and the second tray member 46b to be in a state of being close to each other. With this, the sheet S is supported by the first tray member 46a and the second tray member 46b. On the other hand, in a case where the sheet S moves from the waiting tray 41 to the processing tray 61 of the processing unit 22, the opening and closing driving portion 42 causes the first tray member 46a and the second tray member 46b to move away from each other. With this, the sheet S, supported by the waiting tray 41, falls toward the processing tray 61 from an opening between the first tray member 46a and the second tray member 46b. With this, the sheet S moves from the waiting tray 41 to the processing tray 61.

FIG. 5 illustrates portions around the assist guide 43 in a magnified manner. As illustrated in FIG. 5, the assist guide 43 is provided above the waiting tray 41. For example, the assist guide 43 has approximately the same length as that of the waiting tray 41 in the sheet conveyance direction D1. The assist guide 43 is a plate-like member extending above the waiting tray 41. The sheet S, ejected from the exit rollers 33a and 33b, enters a gap between the assist guide 43 and the waiting tray 41. The sheet S, when entering the waiting unit 21, advances toward the downstream side of the waiting unit 21 while being guided by the assist guide 43 and the waiting tray 41.

When the sheet S moves from the waiting tray 41 toward the processing tray 61, the assist guide 43 urges the sheet S toward the processing tray 61. More specifically, the assist guide 43 is movable between a waiting position (see FIG. 5) and a projecting position (see FIG. 6), which is located below the waiting position after movement. In the waiting position, the entire assist guide 43 is located above the waiting tray 41. In the waiting position, the assist guide 43 is located higher in position than the sheet ejection port 31d of the conveyance path 31. In the projecting position, at least a part of the assist guide 43 projects to a position lower than the lower surface 45a of the waiting tray 41. When the sheet S moves from the waiting tray 41 toward the processing tray 61, the assist guide 43 moves from the waiting position to the projecting position.

As illustrated in FIG. 5, the assist guide 43 has a turn shaft 81, which serves as a fulcrum point (pivot point) of the assist guide 43, at an end portion thereof on the downstream side in the sheet conveyance direction D1. The assist guide 43 has a pressing portion 82, which contacts the sheet S, at an end portion thereof on the upstream side in the sheet conveyance direction D1. The pressing portion 82 comes close to and moves away from the processing tray 61 as the assist guide 43 is turned around the turn shaft 81. When the sheet S moves from the waiting tray 41 toward the processing tray 61, the pressing portion 82 presses the upstream side of the sheet S toward the processing tray 61.

Figure 6:
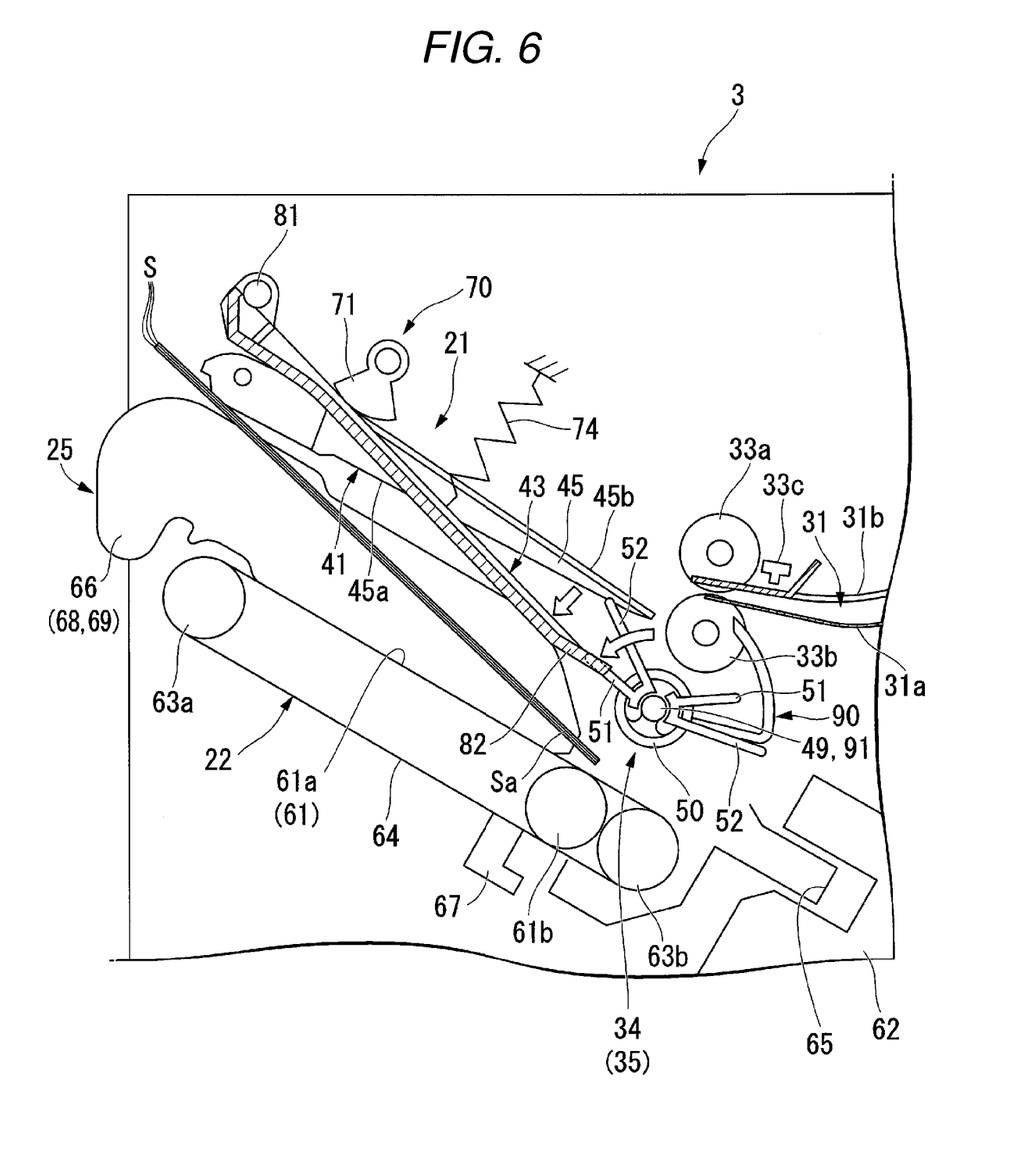
FIG. 6 is a sectional view illustrating the waiting unit and the processing unit according to the embodiment as well as illustrating an example of movement of an assist guide.

FIG. 6 illustrates the assist guide 43 moved to the projecting position. As illustrated in FIG. 6, the pressing portion 82 presses the rear end portion Sa of the sheet S toward the processing tray 61 (downward). The assist guide 43 is driven by a driving mechanism 70. The driving mechanism 70 includes a driving member 71 and a spring 74. The driving member 71 moves the assist guide 43 from the waiting position to the projecting position. The spring 74 urges the assist guide 43 upward (toward the waiting position). When released from pressing-down by the driving member 71, the assist guide 43 returns to the waiting position by the urging force of the spring 74.

The ejection rollers 44a and 44b are provided in the vicinity of the front end portion of the waiting tray 41. The ejection rollers 44a and 44b are arranged in parallel to each other and located opposite each other in the radial direction thereof. The ejection roller 44a is a driving roller located on the side of the upper surface 45b of the waiting tray 41. The ejection roller 44b is a driven roller located on the side of the lower surface 45a of the waiting tray 41. The ejection rollers 44a and 44b nip the sheet S therebetween. In a case where the sheet S is directly ejected from the buffer tray 41 to the ejection unit 23, the ejection roller 44a rotates in a normal direction relative to the sheet conveyance direction (arrow D1) and conveys the sheet S toward the fixed tray 23a of the ejection unit 23.

Next, the paddle unit 34 is described.

As illustrated in FIG. 5, the paddle unit 34 is provided between the upstream side of the waiting tray 41 and the upstream side of the processing tray 61. The paddle unit 34 rotates around a rotational shaft 49 to press the sheet S toward the processing tray 61 (see FIG. 6). When the sheet S moves from the waiting tray 41 toward the processing tray 61, the paddle unit 34 presses the sheet S toward the processing tray 61. The paddle unit 34 moves the sheet S, falling on the processing ray 61, toward the upstream side of the processing unit 22 in the sheet conveyance direction D2.

The paddle unit 34 includes the rotational shaft 49, a rotating body 50, a plurality of first paddles 51, and a plurality of second paddles 52.

The rotational shaft 49 is a rotational center of the paddle unit 34. The rotational shaft 49 is located at a position lower than the waiting tray 41. The rotational shaft 49 extends in the sheet width direction W. The paddle unit 34 is rotated around the rotational shaft 49 in a direction indicated by an arrow A in FIG. 5.

The rotating body 50 is formed in a cylindrical shape. The rotating body 50 is rotated around the rotational shaft 49. The first paddles 51 and the second paddles 52 are mounted on the rotating body 50.

The first paddles 51 and the second paddles 52 protrude from the rotating body 50 in the radial direction of the rotating body 50. Each of the first paddles 51 and the second paddles 52 are made from an elastic material such as rubber. For example, the first paddle 51 is rotated in conformity with timing at which the sheet S moves from the waiting tray 41 toward the processing tray 61. The first paddle 51 presses the sheet S toward the processing tray 61 according to the rotation thereof around the rotational shaft 49. Even when the sheet S adheres to the assist guide 43 due to, for example, static electricity, the first paddle 51 detaches the sheet S from the assist guide 43 and moves the sheet S to the processing tray 61.

The second paddle 52 is located at a position with respect to the first paddle 51 in a direction reverse to the rotational direction of the paddle unit 54 shown by arrow A. The length of the second paddle 52 is greater than the length of the first paddle 51 in the radial direction of the rotating body 50. When being rotated around the rotational shaft 49, the second paddle 52 contacts the upper surface of the uppermost sheet S among a plurality of sheets S falling on the processing tray 61. When being further rotated while contacting the upper surface of the sheet S, the second paddle 52 moves the sheet S to the upstream side as viewed in the sheet conveyance direction D2. The rotational position of the paddle unit 34 taken before the sheet S is pressed toward the processing tray 61 is referred to as an "initial position".

The waiting unit 21 is configured to press the rear end portion Sa of the sheet S in such a manner as to prevent the sheet S from being uplifted on the waiting tray 41. The waiting unit 21 has the rear end chuck 90 as one of members which press the rear end portion Sa of the sheet S on the waiting tray 41. For example, a rotational shaft 91 of the rear end chuck 90 is provided coaxially with the rotational shaft 49 of the paddle unit 34.

When the sheet conveyance device including the exit roller 33a and the ejection roller 44a conveys the second and subsequent sheets S to the waiting unit 21, the rear end chuck 90 presses the rear end portion Sa of the first placed sheet S. The rear end chuck 90 allows the next sheet S to be conveyed onto the waiting unit 21 in both a holding position in which the upstream end portion of the sheet S is held, and a released position in which holding of the upstream end portion of the sheet S is released.

An exit sensor 33c, which detects the downstream end portion of the sheet S, is provided in the vicinity of the exit roller 33a. For example, the post-processing control unit 24 performs pulse control on various driving motors (not illustrated), such as those for the exit roller 33a, the assist guide 43, and the paddle unit 34, according to a detection signal output from the exit sensor 33c.

Next, the processing unit 22 will be described.

The processing unit 22 includes the processing tray 61, a sheet binding processing portion 62, conveyance rollers 63a and 63b, and a conveyance belt 64. One of the conveyance rollers 63a and 63b is a driven roller, and the conveyance belt 64 is driven by the rotation of the driven roller.

The processing tray 61 is provided below the waiting tray 41. The processing tray 61 is slanted with respect to the horizontal direction in such a manner as to be gradually higher when approaching the downstream side in the sheet conveyance direction D2. For example, the processing tray 61 is slanted in such a manner as to be approximately parallel to the waiting tray 41. For example, the sheet S, moving to the processing tray 61, is aligned in the sheet conveyance direction D2 by the rear end stopper 65, which is provided at the upstream side back of the processing unit 22, and the paddle unit 34. Moreover, the sheet S, moving to the processing tray 61, is aligned in the sheet width direction W by the lateral alignment plate 66, which is provided at each side of the processing unit 22 in the sheet width direction W.

For example, the processing unit 22 has a friction roller 61b, which is exposed from a sheet placement surface 61a of the processing tray 61. The friction roller 61b is driven when the sheet S, falling on the processing tray 61, is moved to the upstream side in the conveyance direction.

The processing unit 22 has a bundle claw 67, which is provided on and integrally driven with the conveyance belt 64. The bundle claw 67 is driven together with the conveyance belt 64, and is used to move the sheet S on the processing tray 61 to the downstream side in the conveyance direction.

For example, the post-processing apparatus 3 causes a single sheet S or a plurality of sheets S to wait on the waiting tray 41. For example, after moving the sheet or sheets S from the waiting tray 41 to the processing tray 61, the post-processing apparatus 3 directly conveys sheets S one by one to the processing tray 61. When the sheets S are directly conveyed to the processing tray 61, the waiting tray 41 keeps the first tray member 46a and the second tray member 46b (both shown in FIG. 4) opened. With the waiting tray 41 opened, the post-processing apparatus 3 directly conveys sheets S one by one from the exit rollers 33a and 33b to the processing tray 61.

Figure 11A:
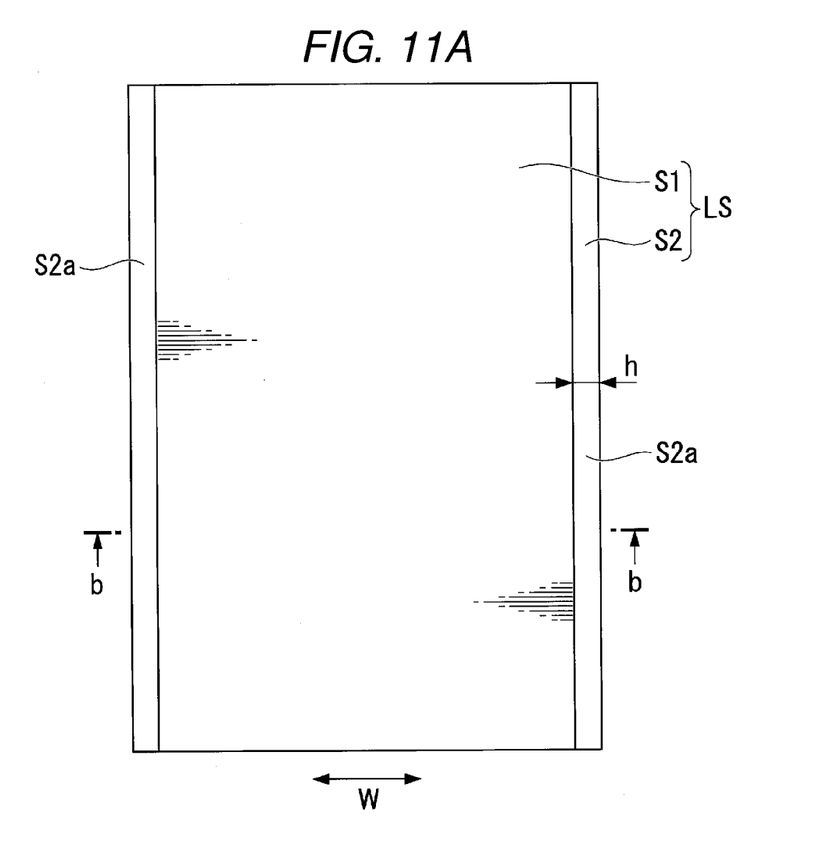
FIG. 11A is a plan view of a label sheet according to the embodiment.
Figure 11B:
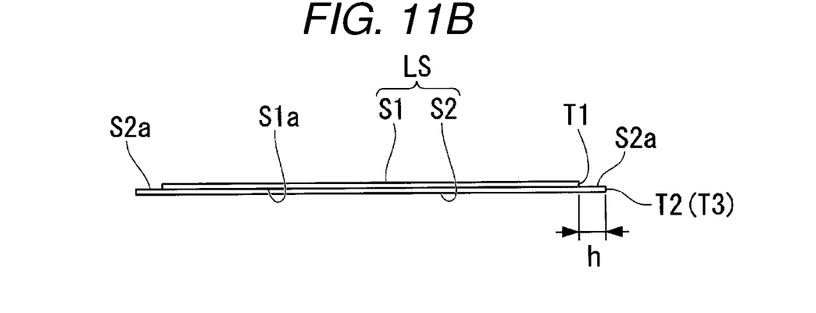
FIG. 11B is a sectional view taken along line b-b in FIG. 11A.

Next, the label sheet LS is described with reference to FIGS. 11A and 11B.

The label sheet LS includes a label paper or body S1 and a liner sheet S2. The label paper S1 has a first surface, which is one of front and back surfaces, serving as a printing surface, and a second surface, which is the other of front and back surfaces, serving as an adhesive surface S1a with an adhesive agent applied thereto. The liner sheet S2 is pasted to the adhesive surface S1a of the label paper S1 in a peelable manner, thus protecting an adhesive layer.

For example, the label sheet LS is a single cut label sheet of A4 or B5 in size. The liner sheet S2 is slightly larger than the label paper S1. The edge T2 of the liner sheet S2 is provided at the side outer than the edge T1 of the label paper S1 in the sheet surface direction. A margin S2a with a width h is provided between the edge T2 of the liner sheet S2 and the edge T1 of the label paper S1. The margin S2a is provided at both sides of the label sheet LS in the sheet width direction W. The margin S2a can be provided at the entire circumference of the label sheet LS. The edge T2 of the liner sheet S2 is aligned with an edge T3 of the label sheet LS.

Next, a procedure for the label peeling process is described with reference to FIG. 7 to FIG. 10. The following processing is performed by the post-processing control unit 24.

Figure 7:
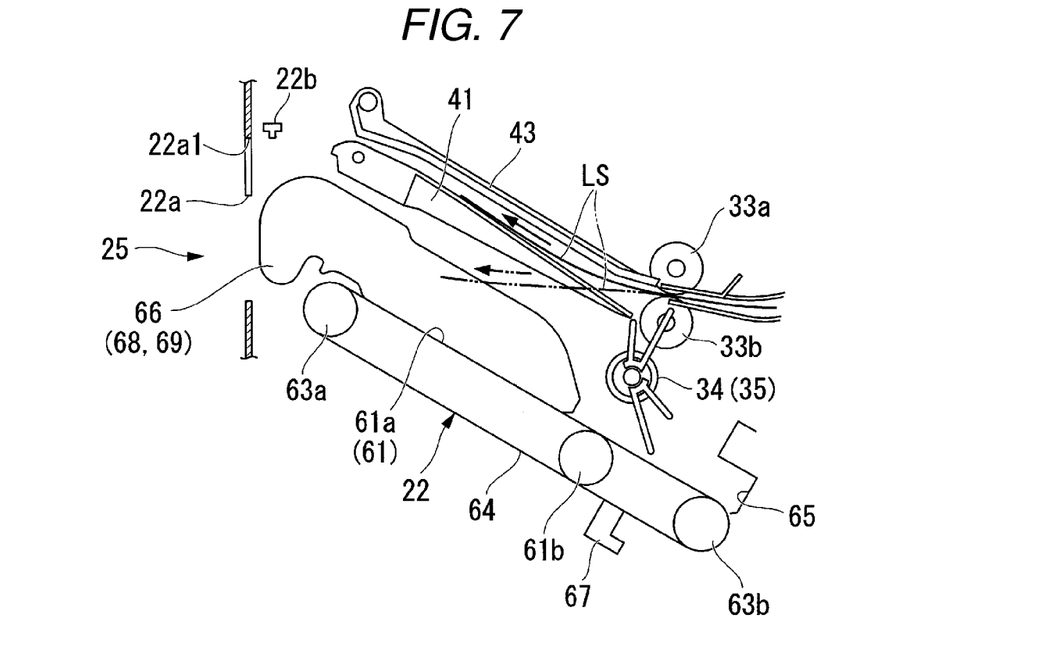
FIG. 7 is a sectional view illustrating an operation of the post-processing apparatus according to the embodiment.

As illustrated in FIG. 7, the waiting unit 21 places the label sheet LS, conveyed by the rotation of the exit roller 33a, on the waiting tray 41. For example, to perform the label peeling process, the waiting unit 21 causes one label sheet LS to wait on the waiting tray 41. The label sheet LS conveyed at this time is indicated by a solid line in FIG. 7. The waiting unit 21 opens the waiting tray 41 in conformity with, for example, timing at which processing performed by the processing unit 22 ends, thus allowing the waiting label sheet LS to fall toward the processing tray 61. Alternatively, the waiting unit 21 keeps the waiting tray 41 opened, thus enabling the label sheet LS to be directly conveyed to the processing tray 61. The label sheet LS conveyed at this time is indicated by a broken (two-dot chain) line in FIG. 7.

Figure 8:
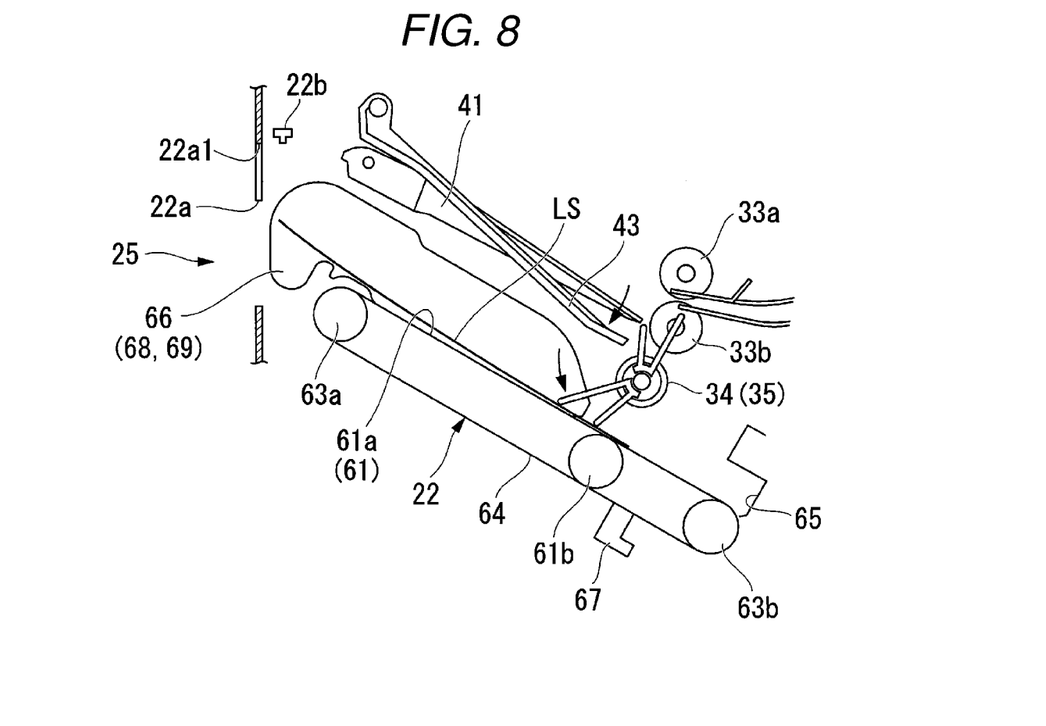
FIG. 8 is a sectional view illustrating an operation of the post-processing apparatus according to the embodiment.

As illustrated in FIG. 8, when the label sheet LS falls onto or is conveyed onto the processing tray 61, the processing unit 22 turns the assist guide 43. Turning of the assist guide 43 urges the label sheet LS toward the processing tray 61. At this time, the processing unit 22 also turns the paddle unit 34. Turning the paddle unit 34 presses the label sheet LS toward the processing tray 61.

After the label sheet LS falls onto or is conveyed onto the processing tray 61, the assist guide 43 returns to the waiting position. For example, the paddle unit 34 continues holding the label sheet LS. With this, positioning of the label sheet LS in the sheet conveyance direction D2 is performed.

Figure 9:
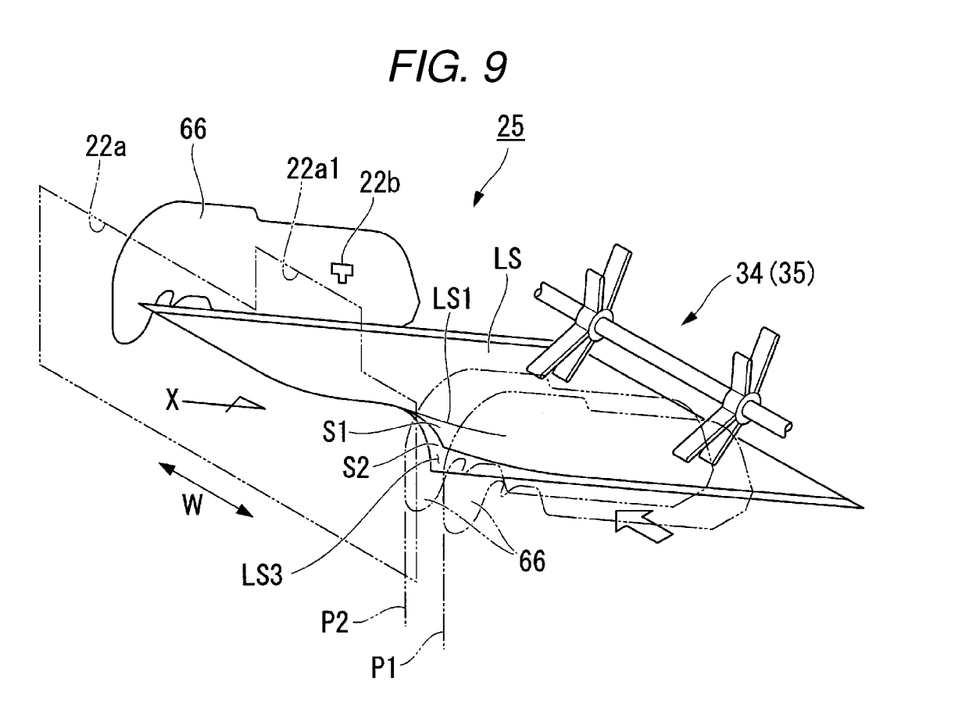
FIG. 9 is a perspective view illustrating an operation of the post-processing apparatus according to the embodiment.
Figure 10:
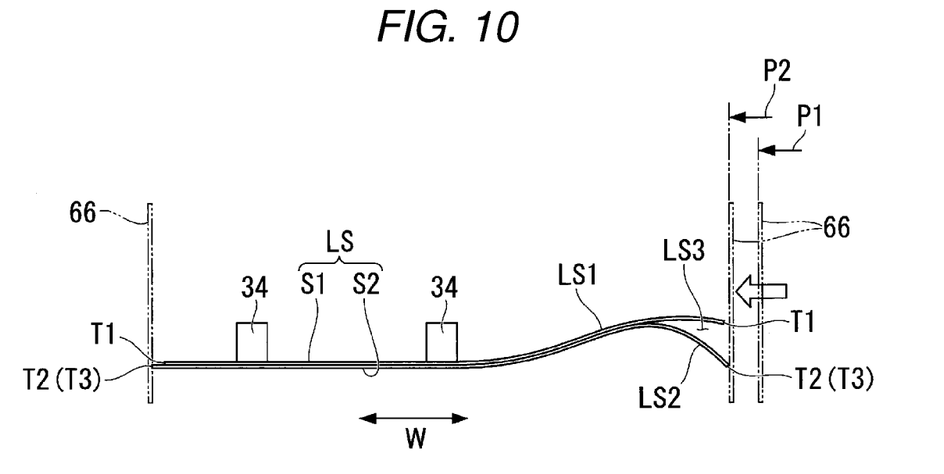
FIG. 10 is a diagram as viewed from the direction of arrow X in FIG. 9.

Furthermore, as illustrated in FIG. 9 and FIG. 10, the lateral alignment plates 66, located at both sides in the sheet width direction W, are individually driven to move forward up to an alignment position P1, which defines the position of the label sheet LS in the sheet width direction W. With this, positioning of the label sheet LS in the sheet width direction W is performed. The sheet width direction W and the sheet conveyance direction D2 are included in the sheet surface direction, which is parallel to the sheet placement surface 61a of the processing tray 61.

At the time of positioning of the label sheet LS, the paddle unit 34 enters a state of holding the rear end portion of the label sheet LS. In this state, for example, one of the pair of lateral alignment plates 66 stops at the alignment position P1, and the other of the pair of lateral alignment plates 66 further moves forward across the alignment position P1 (performs an overstroke). The lateral alignment plate 66 is sized disproportionately at the front side (the downstream side in the conveyance direction) of the processing unit 22. The lateral alignment plate 66 performing an overstroke contacts the front side of the edge T3 of the label sheet LS and then presses the edge T3 toward the inside in the sheet width direction W (the central portion of the label sheet LS). Hereinafter, the position at which the lateral alignment plate 66 presses the edge T3 of the label sheet LS by an overstroke is referred to as a "pressure position P2". The paddle unit 34 is configured as a sheet holding unit, which prevents the movement of the label sheet LS, together with at least a drive source (for example, a pulse motor) of the paddle unit 34.

When the lateral alignment plate 66 presses the edge T3 of the label sheet LS, the edge T3 moves along the sheet placement surface 61a (shown in FIG. 6). On the inner side of the edge T3 in the sheet surface direction, the label sheet LS deforms in such a way as to cause buckling as shown in FIG. 10. With this, on the front side of the label sheet LS, a curved portion LS1, which is curved in such a way as to be uplifted from the processing tray 61, is formed. The curved portion LS1 is curved in such a manner as to be convex upward. A peeling portion LS3, at which the liner sheet S2 and the label paper S1 are peeled from each other on the side of the edge T3, is formed at a downward slanted portion LS2, which extends from the vicinity of the top of the curved portion LS1 to the edge T3.

More specifically, when the edge T3 of the label sheet LS is pressed, the liner sheet S2 is forcibly curved by contacting the lateral alignment plate 66. The edge T1 of the label paper S1, which is located on the inner side of the edge T2 of the liner sheet S2 in the sheet surface direction, does not contact the lateral alignment plate 66. The label paper S1 tries to curve due to adhesive force to the liner sheet S2. At this time, the resistance force of the label paper S1 itself against curving serves as a peeling force for peeling the label paper S1 from the liner sheet S2. With this, a part of the label paper S1 is peeled from the curved liner sheet S2 in such a way as to be uplifted on the side of the edge T3. The above-described processing for forming the peeling portion LS3 serves as label peeling process.

For example, a widened portion 22a1 (shown in FIG. 9), which enables the label sheet LS with the peeling portion LS3 formed to be grasped with the fingers of the user, is provided at the exit 22a of the processing unit 22 on the side of the ejection unit 23. The widened portion 22a1 allows a sensor 22b to detect the access of the fingers of the user to the widened portion 22a1. In other words, the exit 22a of the processing unit 22 allows the sensor 22b to detect the label sheet LS being grasped by the user. When grasping of the label sheet LS by the user is detected, the label peeling device 25 moves the lateral alignment plate 66 backward up to the alignment position P1, which is a position taken before the lateral alignment plate 66 presses the label sheet LS, and releases holding of the label sheet LS by the paddle unit 34. This enables the user to easily extract the label sheet LS.

When the label sheet LS is extracted from the processing unit 22, a subsequent label sheet LS is placed on the processing tray 61, so that the subsequent label sheet LS is subjected to the label peeling process. In this way, the peeling portion LS3 is formed for every label sheet LS, and the label sheets LS can be extracted one by one by the user.

Here, with regard to the label sheet LS with the peeling portion LS3 once formed, even if the label paper S1 re-adheres to the liner sheet S2, the label paper S1 is easily peelable from a region at which the peeling portion LS3 is formed. Therefore, a plurality of label sheets LS each with the peeling portion LS3 once formed can be ejected onto an ejection tray in a stacked manner. Since the user is not required to extract the label sheets LS one by one, convenience can be improved.

The label peeling device 25 is able to adjust the amount of pressing against the label sheet LS by the lateral alignment plate 66 according to the type of the label sheet LS input from the control panel 11. The amount of pressing corresponds to a distance between the alignment position P1 and the pressure position P2 in the sheet width direction W. The amount of pressing suitable for formation of the peeling portion LS3 in the label sheet LS varies according to the type (such as the size, thickness, and stiffness) of the label sheet LS. Therefore, previously inputting information about the type of the label sheet LS enables preventing excessive flexure or insufficient flexure of the label sheet LS. Then, the label peeling process can be efficiently performed.

The label peeling device 25 according to the present embodiment includes the processing tray 61, which is configured to place the label sheet LS thereon, a pressing unit (e.g., the lateral alignment plate 66), which is able to be driven in a direction perpendicular to the conveyance direction D2 of the label sheet LS, and the post-processing control unit 24, which provides peeling control to peel the linear sheet S2 and the label body S1 of the label sheet LS from each other by driving the lateral alignment plate 66 toward the inside of the label sheet LS placed on the processing tray 61 to press the edge T3 of the label sheet LS and curve the label sheet LS.

The lateral alignment plate 66 forms the curved portion LS1, which is curved in such a way as to be uplifted from the processing tray 61, on the side interior of the edge T3 of the label sheet LS in the sheet surface direction, and forms the peeling portion LS3, at which the liner sheet S2 and the label paper S1 are peeled from each other on the side of the edge T3 of the label sheet LS, at the slanted portion LS2, which extends at a slant relative to the sheet surface direction from the edge T3 in the curved portion LS1 toward the inside in the sheet surface direction.

According to this configuration, when the edge T3 of the label sheet LS, placed on the processing tray 61, is pressed to curve the label sheet LS, one of the label paper S1 and the liner sheet S2 (for example, the liner sheet S2) is forcibly curved by contacting the lateral alignment plate 66. Moreover, the other portions of the label paper S1 and the liner sheet S2 (for example, the label paper S1) tries to return to a flat shape due to its restoring force. This restoring force serves as a force for peeling the liner sheet S2 and the label paper S1 from each other, thus forming the peeling portion LS3, at which the liner sheet S2 and the label paper S1 are peeled from each other. The label sheet LS with the peeling portion LS3 formed is extracted from the exit 22a of the processing unit 22. The extracted label sheet LS allows the label paper S1 to be easily peeled from the liner sheet S2. Alternatively, the label sheet LS with the peeling portion LS3 formed is ejected from the exit 22a of the processing unit 22. Since the peeling portion LS3 is once formed in the label sheet LS, the label paper S1 is able to be easily peeled from the region at which the peeling portion LS3 is formed. In this way, such a simple configuration as to form the peeling portion LS3 by pressing the edge T3 of the label sheet LS enables the label paper S1 to be easily peeled.

In the label peeling device 25 according to the present embodiment, the post-processing control unit 24 performs alignment control to define the position of the label sheet LS in the sheet surface direction by driving the lateral alignment plate 66 up to the alignment position P1, which defines the position of the label sheet LS.

According to this configuration, since the lateral alignment plate 66 of the lateral alignment device 68 is used also as a pressing member of the label pressing device 69, an additional, exclusive device for the label peeling process is not required. Therefore, peeling of the label paper S1 from the liner sheet S2 can be facilitated while the device is prevented from increasing in size and in production cost.

In the label peeling device 25 according to the present embodiment, a pair of lateral alignment plates 66 is provided across the label sheet LS in the sheet width direction W intersecting with the sheet conveyance direction D2, and defines the position of the label sheet LS in the sheet width direction by contacting the edges T3 at both sides of the label sheet LS, and the post-processing control unit 24 peels the liner sheet S2 and the label body S1 of the label sheet LS from each other by causing the pair of lateral alignment plates 66 to come close to each other in such a manner that the distance between the pair of lateral alignment plates 66 becomes narrower than the entire width of the label sheet LS in the sheet width direction W.

According to this configuration, the pair of lateral alignment plates 66, which defines the position of the label sheet LS in the sheet width direction W, is also used as a pressing member of the label pressing device 69, an additional, exclusive member for the label peeling process is not required. Therefore, peeling of the label paper S1 from the liner sheet S2 can be facilitated while the device is prevented from increasing in size and in production cost.

In the label peeling device 25 according to the present embodiment, the post-processing control unit 24 is able to adjust the amount of pressing against the label sheet LS by the lateral alignment plate 66 according to the type of the label sheet LS.

According to this configuration, the amount of pressing by the lateral alignment plate 66 is automatically or manually adjusted according to the type (such as the size, thickness, and stiffness) of the label sheet LS. For example, in a case where the label body is a material having a strong restoring force (such as heavy paper or plastic), the amount of pressing is set to be small. In a case where the label sheet LS is a large-sized sheet, the amount of pressing is set to be large. With this, the label peeling process can be efficiently performed.

The label peeling device 25 according to the present embodiment includes the ejection unit 23, which is located at the downstream side of the processing tray 61 in the sheet conveyance direction D2 and onto which the label sheet LS is ejected from the processing tray 61, the lateral alignment plate 66 is located at the side adjacent to the ejection unit 23 in the processing tray 61 and forms the peeling portion LS3, at which the liner sheet S2 and the label body S1 are peeled from each other, in the label sheet LS, and, after extraction of the label sheet LS with the peeling portion LS3 formed from the ejection unit 23 for the processing tray 61 is detected, the post-processing control unit 24 performs control to convey a subsequent label sheet LS onto the processing tray 61.

According to this configuration, the label sheet LS with the peeling portion LS3 formed can be extracted by the user from the ejection unit 23. After extraction of the label sheet LS, the label peeling process can be performed on a subsequent label sheet LS conveyed to the processing unit 22. In other words, processes for forming the peeling portion LS3 can be performed on single cut label sheets LS one by one. Moreover, the label sheets LS each with the peeling portion LS3 formed can be extracted one by one from the ejection unit 23.

The label peeling device 25 according to the present embodiment includes the sensor 22b, which detects that the label sheet LS is grasped by the user at the exit 22a of the processing tray 61, and, when the sensor 22b detects grasping of the label sheet LS, the post-processing control unit 24 decreases the amount of pressing against the label sheet LS by the lateral alignment plate 66.

According to this configuration, if the lateral alignment plate 66 continues to press the label sheet LS, a resistance occurs when the user grasps and extracts the label sheet LS. Therefore, when the user grasps the label sheet LS, the amount of pressing against the label sheet LS by the lateral alignment plate 66 is decreased. With this, a resistance occurring when the label sheet LS is extracted is decreased, so that the label sheet LS can be easily extracted.

The above-described embodiment is not limited to a configuration in which the edge T3 of the label sheet LS having a margin S2a is pressed. For example, a configuration in which the edge T3 of the label sheet LS having no margin S2a is pressed can also be employed.

The above-described embodiment is not limited to a configuration in which the label paper S1 is peeled from the curved liner sheet S2 in such a way as to be uplifted on the side of the edge T3. For example, with regard to label paper S1 that is forcibly curved, a configuration in which the liner sheet S2 is peeled from the curved label paper S1 in such a way as to be uplifted on the side of the edge T3 can also be employed. A configuration in which a label body made from plastic is used instead of the label paper S1 can also be employed.

The above-described embodiment is not limited to a configuration in which the lateral alignment plate 66 presses the edge T3 of the label sheet LS at the downstream side in the sheet conveyance direction D2. For example, the lateral alignment plate 66 can press the edge T3 of the label sheet LS at the upstream side in the sheet conveyance direction D2. For example, the lateral alignment plate 66 can press the edges T3 of the label sheet LS at both the downstream side and the upstream side in the sheet conveyance direction D2.

The above-described embodiment is not limited to a configuration in which the lateral alignment plate 66 is used to press the edge T3 of the label sheet LS. For example, an exclusive pressing unit different from the lateral alignment plate 66 can also be provided to press the edge T3 of the label sheet LS. For example, an exclusive sheet holding unit different from the paddle unit 34 can also be provided to prevent the positional deviation of the label sheet LS. For example, an alignment unit (e.g., the paddle unit 34) of the longitudinal alignment device 35, which defines the position of the label sheet LS in the sheet conveyance direction D2, can also be used to press the edge of the label sheet LS in the sheet conveyance direction D2.

The label peeling device 25 can be provided separately from the image forming apparatus 2 or the post-processing apparatus 3.

According to at least one of the above-described embodiments, the post-processing control unit 24 performs peeling control to peel the liner sheet S2 and the label body S1 of the label sheet LS from each other by driving the lateral alignment plate 66 toward the inside of the label sheet LS placed on the processing tray 61 to press the edge T3 of the label sheet LS and curve the label sheet LS, so that peeling of the label body from the liner sheet can be facilitated with a simple configuration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A post-processing apparatus, comprising:
a sheet conveyance path having an entrance and an exit and configured to permit a label sheet to be conveyed in a sheet conveyance direction along the sheet conveyance path from the entrance to the exit;
a guide along the sheet conveyance path to move in a direction perpendicular to the sheet conveyance direction; and
a control circuit configured to move the guide to align the label sheet in the direction perpendicular to the sheet conveyance direction and to move the guide toward a central portion of the label sheet while the label sheet is on the sheet conveyance path to peel a label body from the label sheet.

2. The post-processing apparatus according to claim 1, wherein the guide positions the label sheet in the direction perpendicular to the sheet conveyance direction.

3. The post-processing apparatus according to claim 1, wherein the guide includes a pair of alignment plates spaced from each other in the direction perpendicular to the sheet conveyance direction, and the pair of alignment plates are positioned so each alignment plate contacts a lateral edge of the label sheet while the label sheet is on the sheet conveyance path.

4. The post-processing apparatus according to claim 3, wherein the control circuit is configured to cause the label body to peel from the label sheet by moving the pair of alignment plates toward each other.

5. The post-processing apparatus according to claim 1, wherein the control circuit is configured to adjust a force applied against a lateral edge of the label sheet by the guide.

6. The post-processing apparatus according to claim 1, further comprising:
ejection rollers at the exit of the sheet conveyance path that are configured to eject the label sheet through the exit.

7. The post-processing apparatus according to claim 1, further comprising:
a sensor to detect when a user has grabbed the label sheet at the exit, wherein
the control circuit is configured to decrease a pressing force applied to the label sheet by the guide when the sensor detects the grabbing of the label sheet by the user.

8. An image forming system, comprising:
an image forming apparatus; and
a post-processing apparatus including:
a sheet conveyance path having an entrance and an exit and configured to permit a label sheet to be conveyed in a sheet conveyance direction along the sheet conveyance path from the entrance to the exit;
a guide along the sheet conveyance path to move the label sheet in a direction perpendicular to the sheet conveyance direction; and
a control circuit configured to move the guide to align the label sheet in the direction perpendicular to the sheet conveyance direction and to move the guide toward a central portion of the label sheet while the label sheet is on the sheet conveyance path to peel a label body from the label sheet.

9. The image forming system according to claim 8, wherein the guide positions the label sheet in the direction perpendicular to the sheet conveyance direction.

10. The image forming system according to claim 8, wherein the guide includes a pair of alignment plates spaced from each other in the direction perpendicular to the sheet conveyance direction, and the pair of alignment plates are positioned so each alignment plate contacts a lateral edge of the label sheet while the label sheet is on the sheet conveyance path.

11. The image forming system according to claim 10, wherein the control circuit is configured to cause the label body to peel from the label sheet by moving the pair of alignment plates toward each other.

12. The image forming system according to claim 8, wherein the control circuit is configured to adjust a force applied against a lateral edge of the label sheet by the guide.

13. The image forming system according to claim 8, further comprising:
    ejection rollers at the exit of the sheet conveyance path that are configured to eject the label sheet through the exit.

14. The image forming system according to claim 8, further comprising:
    a sensor to detect when a user has grabbed the label sheet at the exit, wherein
    the control circuit is configured to decrease a pressing force applied to the label sheet by the guide when the sensor detects the grabbing of the label sheet by the user.

15. A method of peeling a label body from a label sheet in a post-processing apparatus, comprising:
    supplying a label sheet from an image forming apparatus to an entrance of a sheet conveyance path of a post-processing apparatus;
    positioning a guide that is along the sheet conveyance path to position the label sheet in a direction perpendicular to a sheet conveyance direction, the sheet conveyance direction extending along the sheet conveyance path from the entrance to an exit of the sheet conveyance path; and
    moving the guide in the direction perpendicular to the sheet conveyance direction toward a central portion of the label sheet to cause a label body to peel from the label sheet.

16. The method according to claim 15, wherein the guide includes a pair of alignment plates spaced from each other in the direction perpendicular to the sheet conveyance direction.

17. The method according to claim 15, further comprising:
    adjusting a force applied against a lateral edge of the label sheet by the guide.

18. The method according to claim 15, further comprising:
    ejecting the label sheet from the exit.

19. The method according to claim 18, further comprising:
    detecting a grabbing of the label sheet at the exit by a user; and
    decreasing a pressing force applied to the label sheet by the guide when the grabbing of the label sheet is detected.

* * * * *